R. SIEGFRIED.
SUSPENSION MEANS FOR PRIME MOVERS.
APPLICATION FILED MAR. 3, 1906.

931,152.

Patented Aug. 17, 1909.

WITNESSES:
C. L. Belcher
Otto S. Schairer

INVENTOR
Robert Siegfried
BY
Wesley G. Carr
ATTORNEY

UNITED STATES PATENT OFFICE.

ROBERT SIEGFRIED, OF PITTSBURG, PENNSYLVANIA, ASSIGNOR TO WESTINGHOUSE ELECTRIC & MANUFACTURING COMPANY, A CORPORATION OF PENNSYLVANIA.

SUSPENSION MEANS FOR PRIME MOVERS.

No. 931,152. Specification of Letters Patent. Patented Aug. 17, 1909.

Application filed March 3, 1906. Serial No. 304,088.

*To all whom it may concern:*

Be it known that I, ROBERT SIEGFRIED, a citizen of the United States, and a resident of Pittsburg, in the county of Allegheny and State of Pennsylvania, have invented a new and useful Improvement in Suspension Means for Prime Movers, of which the following is a specification.

My invention relates to prime movers and to the means whereby they are supported by and connected to the parts operated thereby and it relates particularly to electric motors and to means whereby they are supported by and connected to shafts or other movable parts.

The object of my invention is to provide novel and improved means whereby electric motors or other prime movers may be resiliently supported and connected to shafts or other movable parts.

The propelling motors of electric railway vehicles are usually supported at one side, by means of bearings, upon the driving axles to which they are operatively connected by speed-changing gearing, resilient suspension means being provided at the other side. In order that a motor may be resiliently supported at both sides, it has been proposed to loosely surround the axle with a quill or sleeve and to resiliently mount or support the sleeve thereon, the motor being geared to and supported at one side upon the sleeve; and for the purpose of relieving the motor and other parts from the severe shocks and strains to which they are usually subjected when the vehicle is suddenly started and stopped, it has been proposed further to introduce resilient driving connections between the sleeve and the axle. I propose to secure the desired result by providing a structure which shall be more simple, compact and practical than those heretofore suggested, and one in which the sleeve, that supports one side of the motor and is geared to it, is resiliently supported out of engagement with the inclosed axle by the same means that affords a driving connection between it and the axle.

Figure 1:
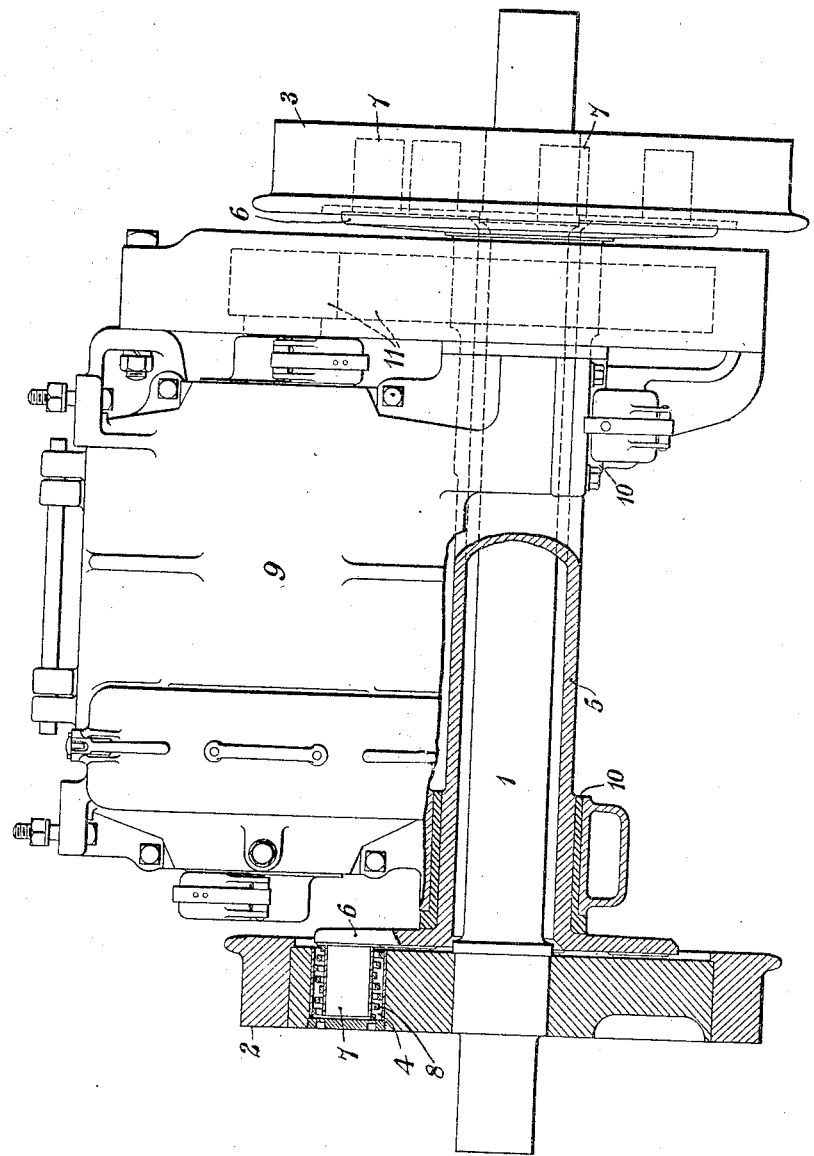
Figure 2:
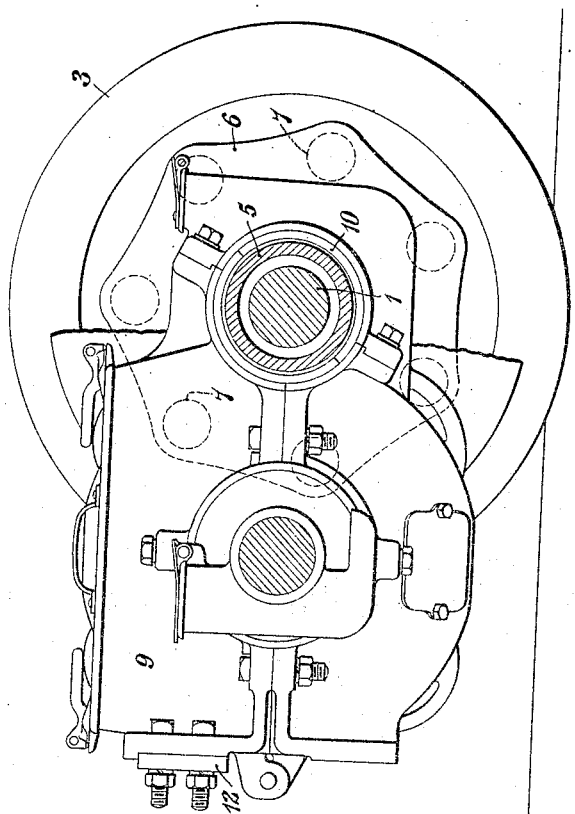

Figure 1 of the accompanying drawings is a plan view of a motor that is supported and connected to the driving axle of an electric locomotive in accordance with my invention, a portion of the structure being broken away for the sake of clearness of illustration, and Fig. 2 is a view, in elevation and in section, on the line II—II of Fig. 1, of the parts shown therein.

An axle 1, that may be the driving axle of an electric locomotive or other vehicle and that is provided at its ends with driving wheels 2 and 3 having sets of annularly arranged chambers 4, is loosely surrounded by a quill 5 having annular flanges or radial arms 6 at its ends and bosses 7, that project therefrom into the wheel chambers 4. The bosses 7 are surrounded within the wheel chambers by suitable resilient means, such as specially formed helical springs 8, that comprise a plurality of convolutions, the adjacent ones of which are eccentric, such a spring forming the subject-matter of a separate application, Serial No. 294,410, filed by me January 3, 1906.

An electric motor 9, whereby the vehicle is propelled, is provided at one side with bearings 10 which, in the present instance, surround and engage the quill 5 instead of bearing upon the axle 1, as is usual, and the rotatable member of the motor is operatively connected to the quill 5 by means of speed-reducing gearing 11, or it may be connected thereto by any other suitable means. The side of the motor opposite the bearings 10 is secured to a cross-bar 12, that may be resiliently supported by any suitable means (not shown), or other means may be provided for resiliently supporting that side of the motor.

The springs 8 serve to introduce resiliency into the connection between the motor and the driving wheels and to thereby reduce the effect, upon the motor and other parts, of shocks and jars caused by sudden starting and stopping of the vehicle or otherwise, and they also serve to resiliently support the side of the motor that is connected to the driving wheels. It will, of course, be understood that the quill may be resiliently connected to the driving wheels in any other suitable manner than that which I have here shown and described and that the electric motor is only indicative of a suitable prime mover or other device that may be similarly mounted and connected thereto.

The structural details and arrangements of the parts may be further modified within considerable limits without altering the mode of operation of the invention or departing materially from its scope.

I claim as my invention:

1. The combination with an axle, wheels mounted thereon having annular sets of chambers, of a quill or sleeve loosely surrounding the axle between the wheels and having radial arms or flanges and bosses that project therefrom into the wheel chambers, resilient cushioning means surrounding the bosses within the chambers, a prime mover on the sleeve and speed-changing connections between the prime mover and the quill.

2. The combination with an axle and wheels mounted thereon having annular sets of chambers, a quill or sleeve loosely surrounding the axle between the wheels and having radial arms or flanges and bosses that project therefrom into the wheel chambers, resilient cushioning means surrounding the bosses within the chambers and a prime mover having bearings at one side thereof upon the quill or sleeve and operative connections between the prime mover and the quill.

3. The combination with an axle, wheels mounted thereon, a quill or sleeve loosely surrounding the axle between the wheels and resilient driving connections between the quill and each of the wheels, said connections serving also to normally support the quill substantially concentric with the axle, of a prime mover, bearings at one side thereof on the quill and operative connections between the prime mover and the quill.

4. The combination with an axle, a quill or sleeve loosely surrounding the same and resilient driving connections between each end of the quill and the axle said connections serving also to normally support the quill out of engagement with the axle, of a prime mover, bearings therefor upon the quill and speed reducing connections between the prime mover and the quill.

5. The combination with an axle, a quill or sleeve loosely surrounding the same and resilient driving connections between each end of the quill and the axle said connections serving also to normally support the quill out of engagement with the axle, of a dynamo-electric machine, bearings therefor upon the quill and speed-reducing connections between the dynamo-electric machine and the quill.

6. The combination with an axle, a quill or sleeve loosely surrounding the same and resilient driving connections between each end of the quill and the axle said connections serving also to normally support the quill out of engagement with the axle, of a dynamo-electric machine, bearings at one side thereof upon the quill and operative connections between the dynamo-electric machine and the quill.

In testimony whereof, I have hereunto subscribed my name this 23rd day of February, 1906.

ROBERT SIEGFRIED.

Witnesses:
OTTO S. SCHAIRER,
BIRNEY HINES.